United States Patent
Mathieu et al.

(10) Patent No.: US 8,692,739 B2
(45) Date of Patent: Apr. 8, 2014

(54) DYNAMIC INFORMATION PRESENTATION ON FULL WINDSHIELD HEAD-UP DISPLAY

(75) Inventors: Roy J. Mathieu, Rochester Hills, MI (US); Joseph F. Szczerba, Grand Blanc, MI (US); Thomas A. Seder, Northville, MI (US); Dehua Cui, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 140 days.

(21) Appl. No.: 13/239,667

(22) Filed: Sep. 22, 2011

(65) Prior Publication Data

US 2013/0076787 A1  Mar. 28, 2013

(51) Int. Cl.
*G09G 5/00* (2006.01)

(52) U.S. Cl.
USPC ............... 345/7; 345/156; 340/436; 382/104

(58) Field of Classification Search
USPC .......................................... 345/7, 156; 701/1
See application file for complete search history.

(56) References Cited

U.S. PATENT DOCUMENTS

| | | | |
|---|---|---|---|
| 6,926,429 B2 * | 8/2005 | Barlow et al. ................ | 362/464 |
| 6,986,581 B2 | 1/2006 | Sun et al. | |
| 7,090,355 B2 | 8/2006 | Liu et al. | |
| 7,182,467 B2 | 2/2007 | Liu et al. | |
| 7,213,923 B2 | 5/2007 | Liu et al. | |
| 7,460,951 B2 | 12/2008 | Altan et al. | |
| 7,486,175 B2 * | 2/2009 | Suzuki et al. ................ | 340/435 |
| 2005/0154505 A1 * | 7/2005 | Nakamura et al. ............ | 701/1 |
| 2008/0158510 A1 | 7/2008 | Tant et al. | |
| 2009/0268946 A1 | 10/2009 | Zhang et al. | |
| 2010/0253489 A1 | 10/2010 | Cui et al. | |
| 2010/0253492 A1 | 10/2010 | Seder et al. | |
| 2010/0253493 A1 | 10/2010 | Szczerba et al. | |
| 2010/0253526 A1 | 10/2010 | Szczerba et al. | |
| 2010/0253539 A1 | 10/2010 | Seder et al. | |
| 2010/0253540 A1 | 10/2010 | Seder et al. | |
| 2010/0253541 A1 | 10/2010 | Seder et al. | |
| 2010/0253542 A1 | 10/2010 | Seder et al. | |
| 2010/0253543 A1 | 10/2010 | Szczerba et al. | |
| 2010/0253593 A1 | 10/2010 | Seder et al. | |
| 2010/0253594 A1 | 10/2010 | Szczerba et al. | |
| 2010/0253595 A1 | 10/2010 | Szczerba et al. | |
| 2010/0253596 A1 | 10/2010 | Szczerba et al. | |
| 2010/0253597 A1 | 10/2010 | Seder et al. | |
| 2010/0253598 A1 | 10/2010 | Szczerba et al. | |
| 2010/0253599 A1 | 10/2010 | Szczerba et al. | |

(Continued)

OTHER PUBLICATIONS

U.S. Appl. No. 12/900,566, Szczerba et al.

(Continued)

*Primary Examiner* — Grant Sitta (57) ABSTRACT

A method to dynamically register a graphic representing essential vehicle information onto a driving scene of a subject vehicle utilizing a substantially transparent windscreen head up display includes monitoring subject vehicle information and identifying the essential vehicle information based on the monitored subject vehicle information. The graphic representing the essential vehicle information is determined and determining, and a preferred location for the graphic upon the substantially transparent windscreen head up display is dynamically registering in accordance with minimizing an operator's head movement and eye saccades for viewing the graphic. The graphic is displayed upon the substantially transparent windscreen head up display based upon the preferred location.

13 Claims, 4 Drawing Sheets

(56) References Cited

U.S. PATENT DOCUMENTS

| | | |
|---|---|---|
| 2010/0253600 A1 | 10/2010 | Seder et al. |
| 2010/0253601 A1 | 10/2010 | Seder et al. |
| 2010/0253602 A1 | 10/2010 | Szczerba et al. |
| 2010/0253688 A1 | 10/2010 | Cui et al. |
| 2010/0253918 A1 | 10/2010 | Seder et al. |
| 2010/0254019 A1 | 10/2010 | Cui et al. |
| 2010/0289632 A1 | 11/2010 | Seder et al. |
| 2010/0292886 A1 | 11/2010 | Szczerba et al. |

OTHER PUBLICATIONS

U.S. Appl. No. 12/903,267, Seder et al.
U.S. Appl. No. 12/980,503, Szczerba et al.
U.S. Appl. No. 12/979,432, Szczerba et al.
U.S. Appl. No. 12/900,539, Seder et al.
U.S. Appl. No. 12/980,522, Seder et al.
U.S. Appl. No. 12/980,612, Szczerba et al.
U.S. Appl. No. 12/981,206, Tsimhoni et al.
U.S. Appl. No. 12/981,602, Szczerba et al.
U.S. Appl. No. 12/982,478, Seder et al.

* cited by examiner

FIG. 9

DYNAMIC INFORMATION PRESENTATION ON FULL WINDSHIELD HEAD-UP DISPLAY

TECHNICAL FIELD

This disclosure is related to dynamic registration of graphical images representing essential vehicle information.

BACKGROUND

The statements in this section merely provide background information related to the present disclosure. Accordingly, such statements are not intended to constitute an admission of prior art.

Vehicle information can include vehicle operation information and vehicle operational environment information that is desired by an operator of the vehicle to be obtained during ongoing operation of the vehicle. Vehicle operation information can include vehicle speed, engine speed, fuel level, battery state-of-charge, transmission state, engine coolant temperature, oil level, tire pressure and wheel slip to name a few. The vehicle operational environment information can include maneuver points for a racecar, other vehicles, potential roadway hazards and intersections to name a few.

It is known, for example, to obtain the vehicle information by looking at vehicle instrument gauges on a vehicle dashboard or human machine interface. Further, the operator can obtain the vehicle operational environment information by viewing landmarks through a windscreen corresponding to a driving scene of the vehicle. However, head movement and eye saccades are frequent to view the vehicle information by conventional methods and can lead to distracting the driver during operation of the vehicle.

Head-up displays project light upon a screen and the light is converted into a viewable display upon the screen. Head-up displays are known to present information to the operator of the vehicle in an effective manner by reducing strain upon the operator by allowing the operator to reduce unnecessary eye scan and glance behavior to remain focused on driving and visual tracking.

SUMMARY

A method to dynamically register a graphic representing essential vehicle information onto a driving scene of a subject vehicle utilizing a substantially transparent windscreen head up display includes monitoring subject vehicle information and identifying the essential vehicle information based on the monitored subject vehicle information. The graphic representing the essential vehicle information is determined and determining, and a preferred location for the graphic upon the substantially transparent windscreen head up display is dynamically registering in accordance with minimizing an operator's head movement and eye saccades for viewing the graphic. The graphic is displayed upon the substantially transparent windscreen head up display based upon the preferred location.

BRIEF DESCRIPTION OF THE DRAWINGS

One or more embodiments will now be described, by way of example, with reference to the accompanying drawings, in which.

DETAILED DESCRIPTION

Referring now to the drawings, wherein the showings are for the purpose of illustrating certain exemplary embodiments only and not for the purpose of limiting the same, a method and an enhanced vision system (EVS) to represent graphical images dynamically registered, and dynamically updated, upon a windscreen of a subject vehicle representing essential vehicle information is disclosed. The graphical images are derived from sensor and/or data inputs monitoring vehicle information by processing the inputs in order to identify and convey the essential vehicle information to the operator of the subject vehicle. Graphical images to be displayed upon the windscreen are dynamically registered to a preferred location upon the windscreen corresponding to a driving scene of the subject vehicle, such that an intended operator or occupant of the subject vehicle may view a vehicular environment surrounding the subject vehicle and the registered graphical image representing the essential vehicle information in a manner that minimizes head movement and eye saccades. Hence, the dynamically registered preferred location is selected in accordance with minimizing head and eye saccades. Further, non-essential vehicle information can be registered to a fixed location upon the substantially transparent head up display outside the foveal view of the intended operator or occupant of the subject vehicle.

Figure 1:
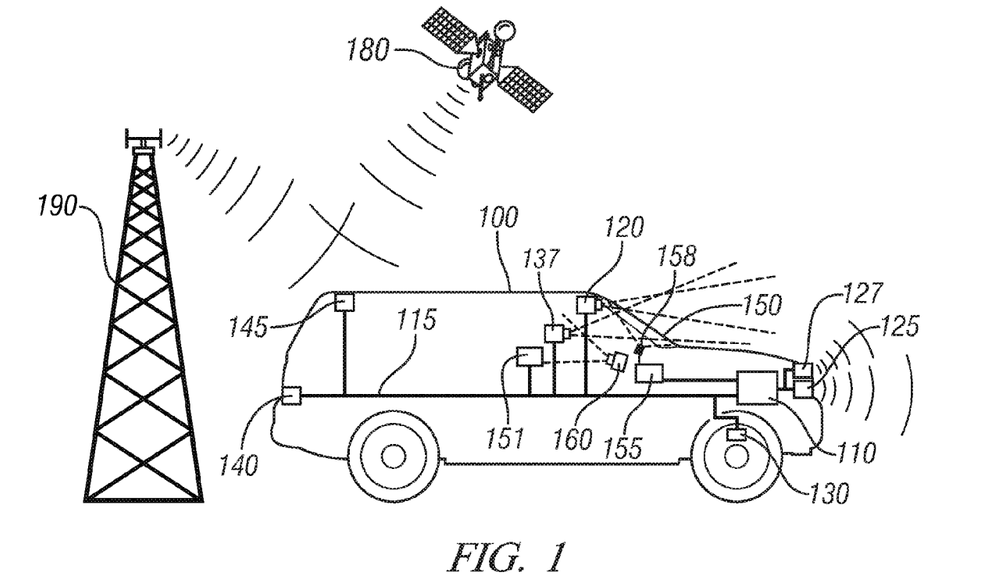
FIG. 1 illustrates an exemplary vehicle equipped with an EVS system, in accordance with the present disclosure.

FIG. 1 illustrates an exemplary vehicle equipped with an EVS system, in accordance with the present disclosure. An exemplary EVS system is disclosed in co-pending U.S. application Ser. No. 12/417,077, which is incorporated herein by reference. Vehicle 100 includes an EVS system manager 110; vehicle sensor systems, including camera system 120, lidar system 127, infrared (IR) imaging device 137 and radar system 125; vehicle operation sensors for monitoring vehicle operation, including vehicle speed sensor 130; information systems, including GPS device 140 and wireless communication system 145; head-up display (HUD) 150; human machine interface (HMI) 151; EVS graphics system 155; graphics projection system 158; and occupant eye location sensing system 160. The EVS system manager 110 includes a programmable processor including programming to monitor various inputs related to vehicle information, identify essential vehicle information based on the monitored inputs related to vehicle information and determine a graphic representing the essential vehicle information. The EVS system manager 110 can communicate directly with various systems and components, or the EVS system manager 110 can alternatively or additionally communicate over a LAN/CAN system 115. The EVS system manager 110 utilizes information regarding the operational environment of the vehicle 100 derived from a number of inputs. Camera system 120 includes a camera or image capturing device taking periodic or sequential images representing a view from the vehicle. The camera or image capturing device of the camera system 120 preferably includes 360 degrees of coverage. Lidar system 127 includes a device known in the art utilizing scattered light to find range and/or other information of other vehicles located near the vehicle (i.e. traffic vehicles). IR imaging device 137 includes a device known in the art utilizing thermal imaging cameras to detect radiation in the infrared range of the electromagnetic spectrum and produce images of that radiation corresponding to traffic vehicles. Images from the IR imaging device 137 and the camera system 120 can be referred to as image data. Radar system 125 includes a device known in the art utilizing electromagnetic radiation to detect traffic vehicles or objects located near the vehicle. The radar system 125 and the lidar system 127 can be referred to as range sensors. A number of known in-vehicle sensors are used within a vehicle to monitor vehicle speed, engine speed, transmission state, engine coolant temperature, fuel economy, battery state-of-charge (SOC), oil level, tire pressure wheel slip, mileage, navigation information, safety information, audio information and other parameters representative of the operation of the vehicle. Vehicle speed sensor 130 represents one such sensor, but the scope of the disclosure includes any such sensors for use by the EVS. GPS device 140 and wireless communication system 145 communicate with resources outside of the vehicle, for example, satellite system 180 and cellular communications tower 190. Data from the internet can be obtained from the wireless communication system 145. GPS device 140 may be utilized in conjunction with a 3D map database including detailed information relating to a global coordinate received by the GPS device 140 regarding the current location of the vehicle. Information from the vehicle sensor systems and the vehicle operation sensors can be utilized by the EVS system manager 110 to monitor the current location and orientation of the vehicle. HUD 150 includes a windscreen equipped with features capable of displaying an image projected thereupon while remaining transparent or substantially transparent such that occupants of the vehicle can clearly observe outside of the vehicle through the windscreen. While HUD 150 includes the windscreen in the front of the vehicle, other surfaces within the vehicle could be used for projection, including side windows and a rear window. Additionally, the view on the front windscreen could be continued upon the front vehicle "A-pillars" and onto the side windows as a continuous image. HMI 151 includes a computing device where the operator of the vehicle can input commands to control various systems of the vehicle in signal communication with the HMI 151 and receive desirable information. For instance, utilizing the HMI 151, the operator can input requests to traffic vehicles (i.e., vehicle to vehicle communication) to help identify the location of the traffic vehicles. Further, the HMI 151 can be utilized by the operator to categorize which monitored vehicle information is essential vehicle information and which is non-essential vehicle information. Operator inputs to the HMI 151 can include utilizing a keyboard, mouse, joystick, controller, gesturing and/or voice commands for the operator input requests. As will be discussed in greater detail below, the HMI 151 can be utilized to receive an operator input to adjust a dynamically registered preferred location of a graphic upon the substantially transparent windscreen head up display to a desired location or area upon the substantially transparent windscreen head up display, wherein the desired location is offset from the preferred location. EVS graphics engine 155 includes display software or programming translating requests to display information from the EVS system manager 110 in graphical representations of the information. The EVS graphics engine 155 includes programming to compensate for the curved and tilted surface of the windscreen and any other surfaces onto which graphics are to be projected. EVS graphics engine 155 controls graphics projection system 158 including a laser or projector device producing an excitation light to project the graphical representations. Occupant eye location sensing system 160 includes sensors to approximate a location of the head of an occupant and further the orientation or gaze location of the eyes of the occupant. Based upon the output of the occupant eye location sensing system 160, the current location and orientation of the vehicle 100 and input data tracking location information regarding the operational environment surrounding the vehicle (e.g., road geometry and/or traffic vehicles), EVS system manager 110 can accurately dynamically register the graphical representations to a preferred location upon the HUD such that the operator sees the images within a foveal or near peripheral view thereby minimizing eye and head saccades.

The EVS described above includes eye sensing and head sensing devices allowing estimation of eye location, allowing dynamic registration of images upon the HUD such that the images correspond to a view of the operator. However, estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle can be used to estimate a position of the driver's head. In another embodiment, manual adjustment of a rearview mirror or mirrors can be used to estimate location of an operator's eyes. A combination of methods, for example, seat position and mirror adjustment angle, can be utilized to estimate operator head location with improved accuracy. Many methods to accomplish accurate registration of graphics upon the HUD are contemplated, and the disclosure is not intended to be limited to the particular embodiments described herein.

An exemplary EVS includes a wide field of view, full windscreen HUD, a substantially transparent screen including functionality to display graphical images projected thereupon; a HUD image engine including a laser or lasers capable of projecting images upon the windscreen; input sources deriving data concerning the operation of the vehicle and the operating environment of the vehicle; and an EVS system manager including programming to monitor inputs from the input devices, process the inputs and determine essential and non-essential vehicle information relative to the operation of the vehicle and the operating environment of the vehicle, and create requests for graphical images to be created by the HUD image engine. However, this exemplary EVS is only one of a wide number of configurations that an EVS can take. For example, a vision or camera system is useful to various EVS applications that will be discussed. However, an exemplary EVS system can operate without a vision system, for example, providing information available from only a GPS device, 3D map database, and in-vehicle sensors. In the alternative, an exemplary EVS system can operate without access to a GPS device or wireless network, instead utilizing inputs only from a vision system and radar system. Many various configurations are possible with the disclosed systems and methods, and the disclosure is not intended to limited to the exemplary embodiments described herein.

Figure 2:
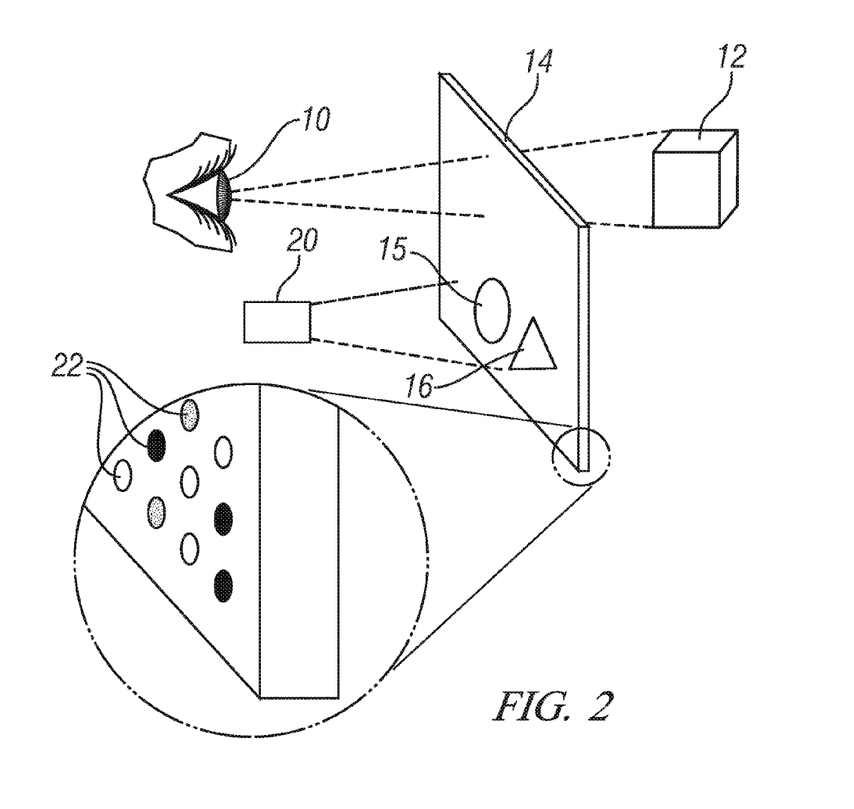
FIG. 2 illustrates a substantially transparent display, in accordance with the present disclosure.

In order to function as a medium through which relevant features are observable while serving as a display device upon which the graphical images may be displayed, the windscreen of the vehicle must be both transparent and capable of displaying images projected by an excitation light source. FIG. 2 illustrates a substantially transparent display, in accordance with the present disclosure. Viewer 10 is able to see an arbitrary object (e.g. cube 12) through substrate 14. Substrate 14 may be transparent or substantially transparent. While viewer 10 sees arbitrary object 12 through substrate 14, the viewer can also see images (e.g. circle 15 and triangle 16) that are created at substrate 14. Substrate 14 may be part of a vehicle windshield, a glass substrate, a plastic substrate, a polymer substrate, or other transparent (or substantially transparent) medium that would be appreciated by one of ordinary skill in the art. Other substrates may complement substrate 14 to provide for tinting, substrate protection, light filtering (e.g. filtering external ultraviolet light), and other functions.

FIG. 2 illustrates illumination of substrate 14 illuminated with excitation light (e.g. ultraviolet light or infrared light) from light sources (e.g. a projector or laser), depicted by device 20. The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

In one embodiment, the excitation light is output by device 20 including a projector. The projector may be a digital projector. The projector may be a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. The projector is a liquid crystal display (LCD) projector. The projector may be a liquid crystal on silicon (LCOS) projector. The projector may be an analog projector (e.g. a slide film projector or a movie film projector). One of ordinary skill in the art would appreciate other types of projectors which may be used to project ultraviolet light on substrate 14.

In another embodiment, an excitation light is output from device 20, including a laser. The intensity and/or movement of a laser beam output from device 20 may be modulated to create an image in substrate 14. In down-conversion embodiments, the output from the laser may be ultraviolet light. In up-conversion embodiments, the output from the laser may be infrared light.

FIG. 2 illustrates light emitting material (e.g. light emitting particles 22) dispersed in a substantially transparent substrate. When excitation light is absorbed by the light emitting particles 22, the light emitting particles emit visible light. Accordingly, in down-conversion embodiments, when ultraviolet light is absorbed by light emitting particles 22, visible light is emitted from the light emitting particles. Likewise, in up-conversion embodiments, when infrared light is absorbed by light emitting particles 22, visible light is emitted from the light emitting particles.

FIG. 2 illustrates light emitting material, including light emitting particles 22, dispersed in a substantially transparent substrate. These light emitting particles 22 can be substantially similar particles throughout, or, as illustrated in FIG. 2, the particles can vary in composition. When excitation light is absorbed by the light emitting particles 22, the particles emit visible light. Accordingly, in down-conversion embodiments, when ultraviolet light is absorbed by light emitting particles, visible light is emitted from the light emitting particles. Likewise, in up-conversion embodiments, when infrared light is absorbed by light emitting particles, visible light is emitted from the light emitting particles. Each light emitting particle may be a different type of light emitting material, which emits a different range of wavelengths of visible light in response to a different range of wavelengths of excitation light (e.g. ultraviolet or infrared light).

Light emitting particles 22 may be dispersed throughout substrate 14. In the alternative, as illustrated in FIG. 2, the particles may be disposed on a surface of substrate 14. Light emitting particles 22 may be integrated into substrate 14 by being coated on substrate 14. Light emitting material may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. Each of the light emitting particles may have a diameter that is less than about 400 nanometers. Each of the light emitting particles may have a diameter that is less than about 300 nanometers, less than about 200 nanometers, less than about 100 nanometers, or less than about 50 nanometers. The light emitting particles may be individual molecules.

Figure 3:
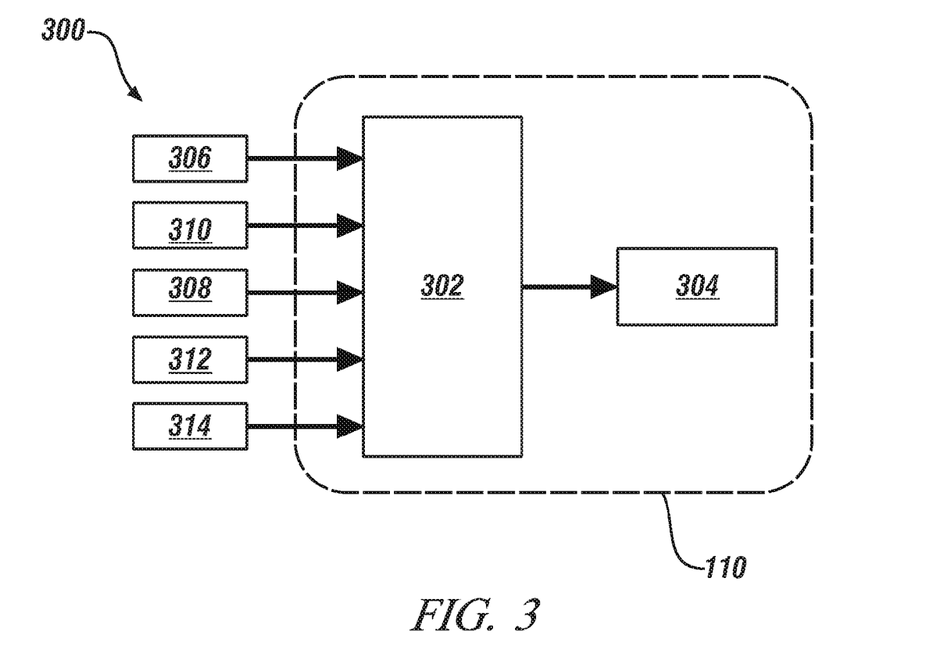
FIG. 3 illustrates an exemplary salient feature tracking system whereby sensor inputs are fused to continuously determine a current location of a remote or salient feature being tracked, in accordance with the present disclosure.

FIG. 3 illustrates an exemplary salient feature tracking system 300 whereby sensor inputs are fused to continuously determine a current location 304 of a remote or salient feature being tracked. Inputs identifying salient features in an operational environment of the vehicle are monitored by a data fusion module 302. The data fusion module 302 is within the EVS system manager 110 and the current location 304 of the remote or salient feature being tracked is stored within the EVS system manager 110. The data fusion module 302 analyzes, filters, or prioritizes the inputs relative to the reliability of the various inputs, and the prioritized or weighted inputs are summed to determine the current location of the salient feature. Salient features can include road or racetrack geometry such as, but not limited to, maneuver points, road edges, reference points, lane markings, road shoulders, a horizon line, approaching curves and turns and locations of speed changes. The maneuver points can include turn-in points, transmission shift points, braking points, acceleration points and coasting points. Salient features can further include objects such as, but not limited to, vehicular traffic, traffic lights and signs, competing race cars, pedestrians, debris and hazards.

The data fusion module 302 is useful to integrate input from various sensing devices and generate a fused track of the salient feature to determine the current location 304 of the salient feature. The fused track includes a data estimate of relative location and trajectory of the salient feature relative to the vehicle. This data estimate, based upon range sensors 306 including radar, lidar and other range finding sensor inputs is useful, but includes the inaccuracies and imprecision of the sensor devices utilized to create the track. As described above, different sensor inputs can be utilized in unison to improve accuracy of the estimates involved in determining the current location 304 of the salient feature (e.g., a competing race car).

A vision system 308 can provide an additional or alternate source of sensor input for use in the salient feature tracking system 300. Pattern recognition, corner detection, vertical edge detection, vertical object recognition, and other methods may be used in analyzing visual information. However, high-resolution visual representations of the field in front a vehicle refreshing at a high rate necessary to appreciate motion in real-time include a very large amount of information to be analyzed. Thus, it is desirable to fuse input from the vision system 308 with the range sensors 306 to focus vision analysis upon a portion of the visual information most likely to determine the current location 304 of the salient feature.

Additional in-vehicle sensors include providing, for example, infrared and ultrasonic information 312 that can be utilized with the data fusion module 302 of the salient feature tracking system 300 to determine the current location 304 of the salient feature.

Further, vehicle to vehicle information 310 can be utilized to determine the current location 304 of the salient feature when the salient feature is a traffic vehicle (e.g., competing race car). When the salient feature is a second vehicle, the second vehicle communicates its current location to the control system (e.g., EVS system manager 110) of a first vehicle (e.g., the vehicle). The current location communicated by the second vehicle can include the second vehicle providing GPS coordinates in conjunction with 3D map data to the first vehicle. The vehicle to vehicle information 310 can be used alone or can be used in the fusion module 302 with the various sensing devices to generate the fused track of the salient feature to determine the current location 303 of the salient feature.

In exemplary embodiments where the vehicle is a competing race car, salient track information 314 can be utilized to determine the current location 304 of the salient feature when the salient feature is related to racetrack geometry. For instance, salient track information 314 can include recorded location points of salient features along a track or road course relevant to the current location and orientation of the vehicle. The recorded location points can be programmed within the EVS system manager 110 providing GPS coordinates in conjunction with 3D map data to the vehicle. In a non-limiting example, a turn-in point can be communicated to the vehicle as the vehicle approaches the turn-in point. The salient track information can also include location points based on vehicle history. For instance, a maneuver point, such as a transmission shift point location, can be determined based on a transmission shift at the same location during a previous lap on a racetrack.

The data fusion module 302 of FIG. 3 can be utilized to continuously monitor the vehicle operational environment using its range sensors (e.g., radar and lidar), cameras, IR imaging devices, vehicle to vehicle communication and salient track information to determine the current location of the salient features. An exemplary trajectory fusing process, disclosed in U.S. Pat. No. 7,460,951, and incorporated herein by reference, permits determining position of a target object (e.g., salient feature) in the XY-coordinate system relative to the vehicle.

All of the mentioned inputs can be utilized by the exemplary EVS system manager 110. Additionally, the EVS system manager 110 may employ the methods described above related to salient feature tracking to monitor vehicle information including essential or non-essential vehicle information within the vehicle operational environment. Hence, monitoring an operational environment of the vehicle can include data obtained from the salient feature tracking system 300.

Figure 4:
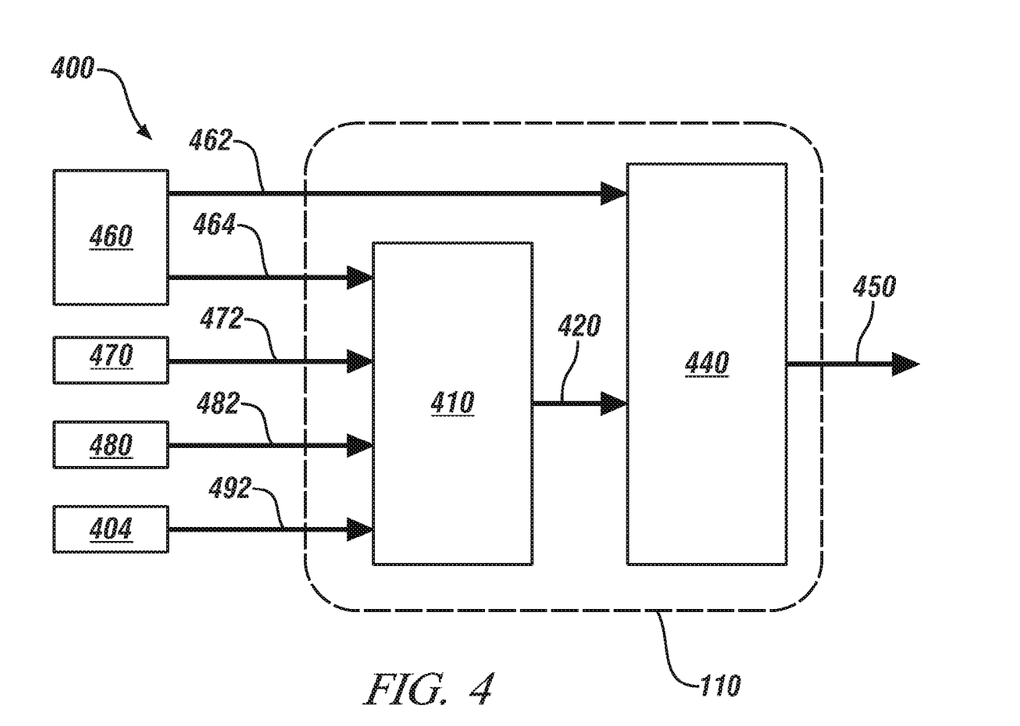
FIG. 4 illustrates an exemplary dynamic registration system, in accordance with the present disclosure.

Embodiments envisioned include dynamically registering a preferred location of a graphic (e.g., representing essential vehicle information) upon the substantially transparent windscreen head up display corresponding to the driving scene where the dynamically registered preferred location is selected in accordance with minimizing operator head movement and eye saccades for viewing the graphic. FIG. 4 illustrates an exemplary dynamic registration system 400 whereby one or more sensor inputs can be utilized to dynamically register the preferred location of the graphic upon the HUD 150, in accordance with an exemplary embodiment of the present disclosure. The dynamic registration system 400 includes a preferred gaze location module 410, a dynamic registration module 440 and a plurality of sensor input modules including a head and occupant eye location module 460, a vehicle location module 470, a vehicle orientation module 480 and an operational environment module 404. The EVS system manager 110 is associated with the preferred gaze location module 410 and the dynamic registration module 440.

The occupant eye location module 460 can utilize data from the occupant eye location sensing system 160 illustrated in FIG. 1 where sensors known in the art can approximate a location of the head of an occupant and further the orientation or gaze location of the eyes of the occupant. An occupant can be an operator of the vehicle or a passenger within the vehicle. Head and eye sensing devices are known in the art and will not be discussed in great detail here. For the purposes of this disclosure, a camera based device is utilized in combination with image recognition software to estimate a three-dimensional head location within the vehicle, able to be coordinated with a vehicle coordinate system, and a direction of occupant's gaze (i.e., operator gaze location) based upon image recognition programming. The data related to the occupant eye and head location 464 can be input to the preferred gaze location module 410 and the data related to the operator gaze location 462 can be directly input to the dynamic registration module 440.

In an exemplary embodiment of the present disclosure, the dynamic registration module 440 determines a dynamically registered preferred location of a graphic based on the operator gaze location 462. The graphic can be displayed at the operator gaze location or offset from the operator gaze location. Specifically, the dynamically registered preferred location 450 of the graphic may dynamically emulate movement of the operator gaze location based on monitoring data related to the operator gaze location.

The vehicle location module 470 can determine the current location of the vehicle by methods known in the art such as, but not limited to, monitoring vehicle data history and monitoring the GPS device 140 in conjunction with a 3D map database. Data related to the current location 472 of the vehicle can be input to the preferred gaze location module 410.

The vehicle orientation module 480 can determine the current orientation of the vehicle by methods known in the art such as, but not limited to, monitoring the GPS device 140 in conjunction with a 3D map database and a digital compass including detailed information relating to a global coordinate received by the GPS device 140 regarding the current orientation of the vehicle. The current orientation can also be determined by vehicle kinematics including at least vehicle speed and yaw rate, available through sensors monitoring vehicle operation and/or monitoring accelerometer readings. Further, vehicle heave, pitch, roll, yaw and warp rates can be taken into account when determining the current orientation of the vehicle. Data related to the current orientation 482 of the vehicle can be input to the preferred gaze location module 410.

The operational environment module 404 can monitor the operational environment and determine a reference view point based on the monitored vehicle operational environment. The reference view point can correspond to a salient feature or other object that should be viewed by an operator during operation of the vehicle to promote vehicle racing performance and/or vehicle safety. For instance, in applications where the vehicle is a competing racecar, the reference view point can correspond to an approaching maneuver point such as a turn-in point on a race track that the operator of the competing racecar should be viewing while on a straight-away. In another non-limiting example, the reference view point can correspond to a horizon line. Data obtained by the exemplary salient feature tracking system 300 illustrated in FIG. 3 may be used to determine the reference view point. Hence, the current location 304 of the salient feature (e.g., an approaching maneuver) can correspond to the reference view point. Data related to the reference view point 492 can be input to the preferred gaze location module 410.

Based on a relationship between the data related to the occupant eye and head location 464, the current location and orientation of the vehicle 472,482, respectively, and the reference view point 492, the preferred gaze location module 410 can determine a preferred gaze location 420 that is input to the dynamic registration module 440. The preferred gaze location 420 represents a location upon the HUD corresponding to the driving scene at which the operator should be gazing. In an exemplary embodiment of the present disclosure, the dynamic registration module 440 can determine a dynamically registered preferred location 450 of a graphic based on the preferred gaze location 420. For instance, the graphic can be displayed at the preferred gaze location or at a position offset from the preferred gaze location.

In yet another exemplary embodiment of the present disclosure, the dynamic registration module 440 can determine a dynamically registered preferred location 450 of a graphic based on a distance between the operator gaze location 462 and the preferred gaze location 420. The distance can correspond to an average distance, or mid-way point, or user-defined distance between the operator gaze location 462 and the preferred gaze location 420. In other words, the dynamically registered preferred location can correspond to an intersection point between the operator gaze location 462 and the preferred gaze location 420 when an operator's gaze is moving toward the preferred gaze location 420.

The dynamically registered preferred location can be adjusted to a desired location upon the substantially transparent windscreen head up display based on an operator input. For instance, an operator can adjust the dynamically registered preferred location of a graphic to a more desirable location on the HUD 150 by an operator input to the HMI 151 utilizing a controller, joystick, voice command, gesturing, knob or other input mechanism. The adjusting can include offsetting the dynamically registered preferred location by increments based on the operator input.

Further embodiments envisioned include monitoring the vehicle operational environment and identifying a salient driving scene feature concerning operation of the vehicle based on the monitored vehicle operational environment. The salient driving scene feature concerning operation of the vehicle can include any salient feature that has an adverse affect on the operation of the vehicle or may have an adverse affect on the operation of the vehicle. When the dynamically registered preferred location of the graphic is between an operator's eye location and the salient driving scene feature, the preferred location of the graphic can be dynamically adjusted to a viewing location upon the HUD not between the operator's eye location and the salient driving scene feature. In a non-limiting example, the salient driving scene feature concerning operation of the vehicle can be a potential roadway hazard such as a pothole, where it would be desirable for the operator of the vehicle to view the pothole so that the operator can avoid the pothole. Dynamically adjusting the preferred location of the graphic to a viewing location upon the HUD not between the operator's eye location and the pothole can enable the operator to view the pothole without the displayed graphic obstructing the operator's view. For instance, the dynamically adjusted preferred location can include slightly offsetting the preferred location of the graphic so that it is never between the operator eye location and the salient driving scene feature. Alternatively, when the dynamically registered preferred location of the graphic is between the operator's eye location and the salient driving scene feature, the illumination of the graphic displayed upon the HUD can be decreased. In the non-limiting example above, decreasing illumination of the graphic displayed upon the substantially transparent windscreen head up display can enable the operator to more clearly view the pothole without being distracted by the luminance of the displayed graphic obstructing the operator's view. In another alternative embodiment, the dynamically registered preferred location of the graphic displayed upon the HUD can be temporarily removed when the graphic is between the operator's eye location and the salient driving scene feature.

A first graphic representing essential vehicle information will be dynamically registered at the preferred location upon the substantially transparent windscreen head up display that is within the foveal or near peripheral view of the operator to minimize head movement and eye saccades. Further, a second graphic representing non-essential vehicle information can be registered to a fixed location upon the HUD or dynamically registered to another preferred location upon the HUD that is outside the foveal view of the operator.

Figure 5:
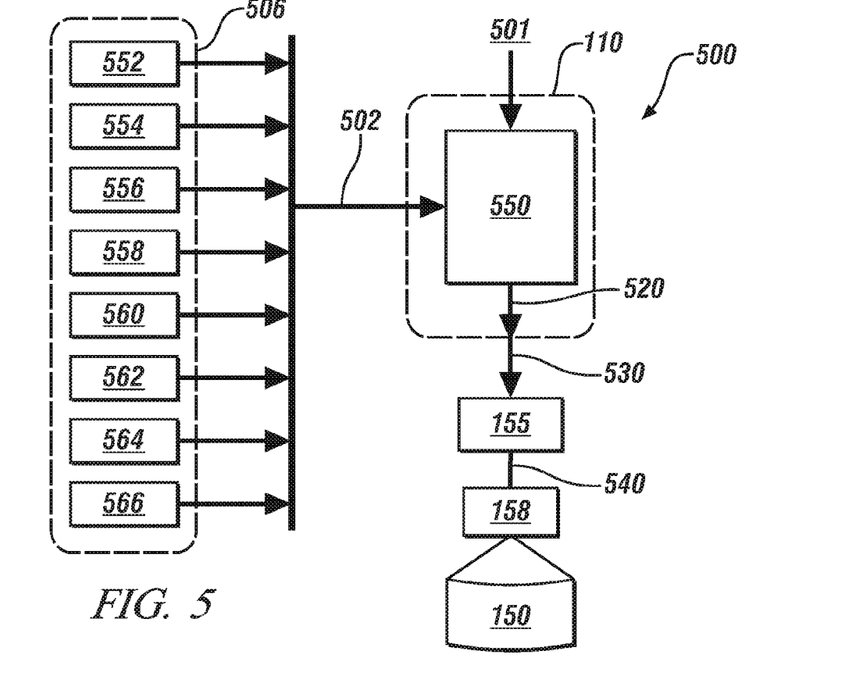
FIG. 5 illustrates an exemplary control scheme to monitor vehicle information and identify essential vehicle information based on the monitored vehicle information, in accordance with the present disclosure.

FIG. 5 illustrates an exemplary control scheme 500 to monitor vehicle information, identify essential vehicle information based on the monitored vehicle information and determine a first graphic representing the essential vehicle information, in accordance with the present disclosure. An essential vehicle information module (EVIM) 550 associated with the EVS system 112 manager analyzes vehicle information inputs 502 utilized by the EVIM 550 to identify and differentiate essential vehicle information 520. The EVIM 550 utilizes the vehicle information inputs 502 from a plurality of vehicle sensors and data modules 506 to monitor vehicle operation and the vehicle operational environment. Each of the plurality of vehicle sensors and data modules 506 can be utilized alone or in unison with other sensors and data modules depending on the application in monitoring the vehicle operation and the vehicle operational environment to generate the vehicle information inputs 502 utilized by the EVIM 550 to identify and differentiate the essential vehicle information 520. The plurality of data sensors and data modules 506 can include an in-vehicle module 552 configured to monitor vehicle operation. The in-vehicle module 552 can include the aforementioned known in-vehicle sensors used within the vehicle to monitor vehicle speed, engine speed, transmission state, engine coolant temperature, fuel economy, battery SOC, oil level, tire pressure wheel slip, odometer mileage and other parameters representative of the operation of the vehicle. The plurality of vehicle sensors and data modules 506 can further include sensors and data modules for monitoring the vehicle operational environment including data from a range module 554, data from a vision module 556 capable of capturing images with 360 degrees of rotation, data from an IR imaging module 558, data from a vehicle to vehicle module 560, data from a vehicle history module (VHM) 562, data from a wireless communications module (WCM) 564 and data form a stored data module (SDM) 566. The data from the range module can include range data from the radar system 125 and the lidar system 127 of FIG. 1, respectively. Likewise, the vision data can be referred to as vision or image data from the camera system 120 of FIG. 1. The IR imaging data can be referred to as image data from the IR imaging device 137 of FIG. 1. The data from the vehicle to vehicle module 560, also referred to as vehicle to vehicle communication, includes utilizing GPS and 3D map data, the wireless communication system 145, the satellite system 180 and the cellular communications tower 190. The VHM 562 includes previously travelled routes or laps by the vehicle and essential vehicle information identified along the previous travelled routes or laps, wherein the identity and location of the essential vehicle information is recorded and stored in memory. The WCM 564 can include data input from a source outside the vehicle such as a crew chief relating vehicle information to the operator concerning the operational environment of the vehicle. The SDM 566 can include data pertinent to the road or racetrack the vehicle is travelling. The data of the SDM 566 can be stored on a USB thumb drive or pre-loaded on a hard drive associated with the EVS system manager 112. For instance, the SDM 566 can include a particular race track's 3D map data that a race car is racing on.

The control scheme 500 further includes the EVS system manager 110 monitoring information from the EVIM 550 and generating display requirements 530 based on the essential vehicle information 520 generated by the EVIM 550, EVS graphics system 155 monitoring the display requirements 530 from the EVS system manager 110 and generating graphics commands 540, and a graphics projection system 158 projecting light upon a head-up display 150.

Vehicle information can include any information relating to vehicle operation and a vehicle operational environment. For instance, vehicle information relating to vehicle operation can include, but is not limited to, vehicle speed, engine speed, transmission state, engine coolant temperature, fuel economy, battery SOC, oil level, tire pressure, wheel slip, odometer mileage and other parameters representative of the operation of the vehicle. Similarly, vehicle information relating to the vehicle operational environment can include racing information such as, but not limited to, maneuver points, a view from behind the vehicle, location and orientation of other race vehicles, lap times, lap splits, laps remaining and warning and informational race flags. As aforementioned, maneuver points can include turn-in points, shift points, brake points, acceleration points and coasting points along a racetrack. The warning and informational race flags can include, but are not limited to, start flags, stop flags, caution flags, pit flags, finish flags, mechanical flags, penalty flags, track deterioration flags, and flags indicating the vehicle's position. It will be understood that the vehicle operational environment information can include non-racing information such as, but not limited to, potentially threatening hazards along a roadway, navigation information, safety information, location and orientation of the vehicle, estimated time of arrival and audio information (e.g., radio station/radio frequency). However, vehicle information is not limited to the vehicle information listed above, and it may include any information that relates to vehicle operation, the vehicle operational environment or any other form of information the operator of the vehicle desires to be monitored.

Essential vehicle information 520 is based on the monitored vehicle information (e.g., vehicle information inputs 502), where the essential vehicle information 520 can be user-defined and user-specified according to a user input 501. Hence, the user input may define and specify essential vehicle information. The user input defining and specifying the essential vehicle information can be carried out as an input to the HMI device 151. In other words, the operator can categorize specific monitored vehicle information as essential vehicle information. For instance, a race car driver may define and specify that every time the vehicle completes a lap, the lap time and lap position is deemed essential information. In another instance, the operator may desire a monitored transmission range state to be essential vehicle information only near approaching shift points on a racetrack. In yet another instance, the operator may desire a monitored engine speed to be essential vehicle information throughout operation of the vehicle, where a graphic representing the engine speed would be dynamically registered to a preferred location and displayed upon the HUD. In yet another instance, the operator of the vehicle may require the view behind the vehicle to be essential vehicle information any time a traffic vehicle is approaching the rear of the vehicle, where the graphic representing the view behind the vehicle can include a virtual review mirror displayed upon the HUD. Additionally, the essential vehicle information can correspond to critical vehicle information. Critical vehicle information can include information that the operator of the vehicle may define as important. For instance, essential vehicle information corresponding to vehicle information that the operator of the vehicle defines as important can include anytime the fuel and/or battery SOC in the vehicle fall below or rise above predetermined or desired levels. Critical information can further include information requiring immediate attention by the operator of the vehicle. For instance, essential vehicle information corresponding to information requiring immediate attention by the operator of the vehicle can include roadway hazards that are a threat or potential threat to the vehicle and should be addressed. Accordingly, the graphic representing the essential vehicle information (e.g., critical information) can provide the functionality of prompting the driver to take notice of the essential vehicle information.

Embodiments envisioned include utilizing the plurality of vehicle sensors and data modules 506 to monitor vehicle information that includes vehicle operation and an operational environment relative to the vehicle (i.e., vehicle operational environment). Based on the vehicle information inputs 502 and the user input 501 defining and specifying the essential vehicle information, the EVIM 550 can identify the essential vehicle information 520, wherein the EVS graphics system 155 determines the graphic representing the essential vehicle information and a preferred location is dynamically registered upon the substantially transparent head-up display corresponding to the driving scene. The graphics projection system 158 displays the graphic onto the driving scene of the vehicle utilizing the head-up display. The display requirements 530 input to the EVS graphics system 155 can correspond to the dynamically registered preferred location 450 determined in the dynamic registration system 400 illustrated in FIG. 4 above.

In an exemplary embodiment, monitoring vehicle information including the vehicle operational environment includes monitoring road geometry and monitoring a location and an orientation of the vehicle and utilizing the EVIM 550 to determine a distance to an approaching maneuver point on a racetrack/course based on the monitored road geometry and the monitored location and orientation of the vehicle. The approaching maneuver point may be represented as a graphic depicting a decreasing distance as the vehicle gets closer to the maneuver point. In a non-limiting example, the location and orientation of the vehicle can be monitored utilizing module 552 associated with the GPS device 140 in conjunction with a 3D map base and a digital compass. The location and orientation of the vehicle can also be monitored utilizing the vehicle location and vehicle orientation modules 470, 480, respectively, illustrated in the dynamic registration system 400 of FIG. 4. The road geometry can be monitored utilizing one or any combination of the plurality of vehicle sensors and data modules 506. Likewise, data from the salient feature tracking system 300 can be utilized to monitor road geometry. The EVS graphics system 155 can determine a registered graphic representing the distance to the approaching maneuver point. A similar method can be employed to determine a distance to an approaching maneuver point along a racetrack/course based on the monitored road geometry and the monitored location and orientation of the vehicle.

In another exemplary embodiment, monitoring vehicle information including monitoring the vehicle operational environment includes monitoring a location and an orientation of each of a plurality of traffic vehicles and monitoring a location and an orientation of the vehicle. In a non-limiting example, the traffic vehicles may correspond to competing race vehicles on a racetrack/course. Each of the plurality of traffic vehicles (e.g., competing race vehicles) can be monitored utilizing one or any combination of the plurality of vehicle sensors and data modules 506. Likewise, data from the salient feature tracking system 300 can be utilized to monitor road geometry. In a non-limiting example, the vehicle to vehicle module 560 may be utilized where the location and orientation of each of the plurality of vehicles is sent to the vehicle. Accordingly, the EVIM 550 can determine a racetrack/course position of the vehicle and each of the plurality of traffic vehicles (e.g., competing race vehicles) based on the monitored location and orientation of the vehicle and each of the plurality of traffic vehicles (e.g., competing race vehicles).

The essential vehicle information may be dynamically updated based on changes or transitions to the monitored vehicle information. For instance, essential vehicle information corresponding to critical vehicle information may no longer be deemed critical vehicle information, and therefore, will no longer be deemed essential. In another instance, an approaching maneuver point (e.g., shift-point) may no longer be deemed essential vehicle information if the operator of the vehicle has performed the maneuver. In yet another instance, vehicle track positions of competing race cars can be dynamically updated when changes occur among the vehicle track positions.

Figure 6:
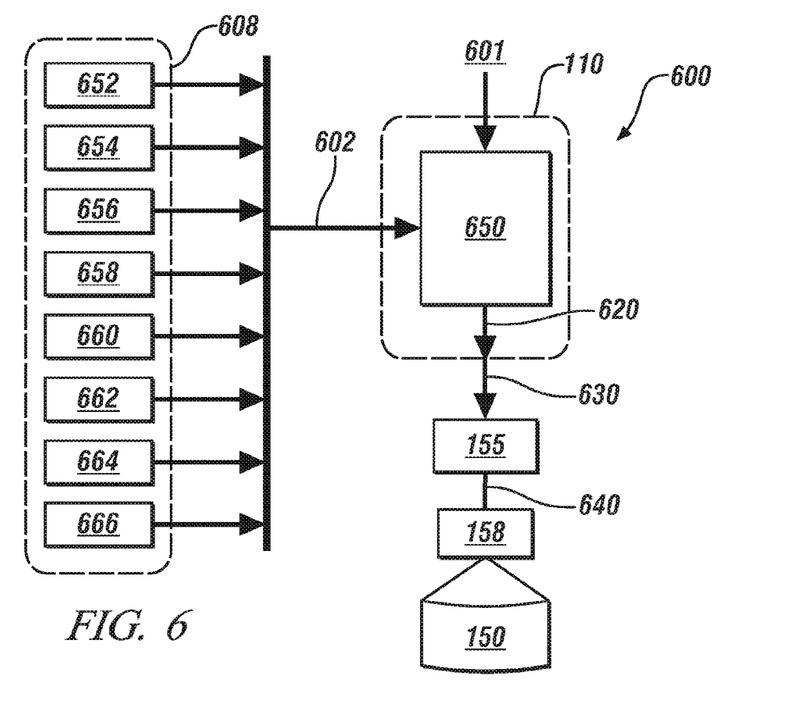
FIG. 6 illustrates an exemplary control scheme to monitor vehicle information and identify non-essential vehicle information based on the monitored vehicle information, in accordance with the present disclosure.

FIG. 6 illustrates an exemplary control scheme 600 to monitor vehicle information identify non-essential vehicle information based on the monitored vehicle information and determine a second graphic representing the non-essential vehicle information, in accordance with the present disclosure. A non-essential vehicle information module (NEVIM) 650 associated with the EVS system 112 manager analyzes vehicle information inputs 602 utilized by the NEVIM 650 to identify and differentiate non-essential vehicle information 620. The NEVIM 650 utilizes vehicle information inputs 602 from a plurality of vehicle sensors and data modules 608 to monitor vehicle operation and the vehicle operational environment. It will be understood that each of the plurality of vehicle sensors and data modules 606 can be utilized alone or in unison with other sensors and data modules depending upon the application in monitoring the vehicle operation and the operational environment of the vehicle to generate the vehicle information inputs 602 utilized by the NEVIM 650 to identify and differentiate the non-essential vehicle information 620. The plurality of vehicle sensors and data modules 608 can include an in-vehicle module 652, a range module 654, a vision module 656, an IR imaging module 658, a vehicle to vehicle module 660 a vehicle history module (VHM) 662 and a wireless communications module 664. The plurality of vehicle sensors and data modules 608 can correspond to the plurality of vehicle sensors and data modules 506 of the control scheme 500 illustrated in FIG. 5, and will not be discussed herein.

The control scheme 600 further includes the EVS system manager 110 monitoring information from the NEVIM 650 and generating display requirements 630 based on the essential vehicle information 620 generated by the NEVIM 650, EVS graphics system 155 monitoring the display requirements 630 from the EVS system manager 110 and generating graphics commands 640, and a graphics projection system 158 projecting light upon a head-up display 150.

The non-essential vehicle information 620 is based on the monitored vehicle information (e.g., vehicle information inputs 602), where the non-essential vehicle information can be user-defined and user-specified according to a user input 601. Hence, the user input may define and specify non-essential vehicle information. In other words, the operator can categorize specific monitored vehicle information as non-essential vehicle information. For instance, the operator may desire the current time to be non-essential vehicle information. In another instance, the ambient temperature may be non-essential vehicle information. In yet another instance, a current track position may be non-essential vehicle information.

Embodiments envisioned include utilizing the NEVIM 650 to identify non-essential vehicle information 620 based on the vehicle information inputs 602 and the user input 601 defining and specifying non-essential vehicle information. The EVS graphics system 155 determines the second graphic representing the non-essential vehicle information and a fixed-location is registered upon the substantially transparent windscreen head up display corresponding to the driving scene. The graphics projection system 158 displays the second graphic onto the driving scene of the vehicle utilizing the head-up display.

In an exemplary embodiment the second graphic is registered to a fixed location upon the substantially transparent windscreen head up display. For instance, the fixed location can correspond to a corner of the HUD. Utilizing the salient feature tracking system 300 of FIG. 3, salient features concerning operation of the vehicle can be identified based on the monitored vehicle operational environment. When a salient feature is within a predetermined viewing area of the registered fixed-location of the second graphic, the illumination of the second graphic displayed upon the HUD can be decreased such that the salient feature can be clearly viewed by the operator of the vehicle.

In another exemplary embodiment, the second graphic can be dynamically registered to a preferred location upon the substantially transparent windscreen head up display corresponding to the driving scene. Dynamically registered preferred locations are discussed above with reference to the dynamic registration system 400 of FIG. 4. However, the dynamically registered preferred location of the second graphic upon the HUD will be outside the foveal view of the operator because the information to be viewed is not essential vehicle information.

Methods known in the art can be utilized to determine a historical vehicle operation profile during a route travelled by the vehicle. The historical vehicle operation profile can be determined by monitoring the location and orientation of the vehicle and monitoring vehicle operation. The monitored vehicle operation can be user-defined and/or user-selected and can include, but is not limited to, monitoring vehicle speed, vehicle acceleration/deceleration, steering, transmission shifting, braking, track position and location, racing lines and lap positions/times. Accordingly, the historical vehicle operation profile can be recorded and stored in on-board and/or off-board databases, where a playback of the historical vehicle operation profile can be viewed. Further a preferred vehicle operation profile can be determined based on the monitored location and orientation of the vehicle and the monitored vehicle operation. The preferred vehicle operation profile can correspond to ideal or optimum vehicle performance for the same route travelled by the vehicle having the historical vehicle performance profile. As such, the historical vehicle operation profile and the preferred vehicle operation profile can be compared. The comparing can be accomplished by methods known in the art such as time stamping and/or matching geographical coordinates. For instance, historical vehicle operation at a given vehicle location and orientation can be compared to preferred vehicle operation performance at the same vehicle location and orientation. In a non-limiting example, a historical vehicle operation profile consisting of transmission-shift points can be determined for a lap around a race course, where the historical vehicle operation profile can be compared to a preferred vehicle operation profile consisting of ideal or optimum transmission-shift points for the same lap around the race course. In the non-limiting example, the comparing can be conducted at a later time, such as after a race or training session, for purposes of educating the operator of when and where ideal or optimum transmission-shift points were either accomplished or missed by the operator.

Figure 7:
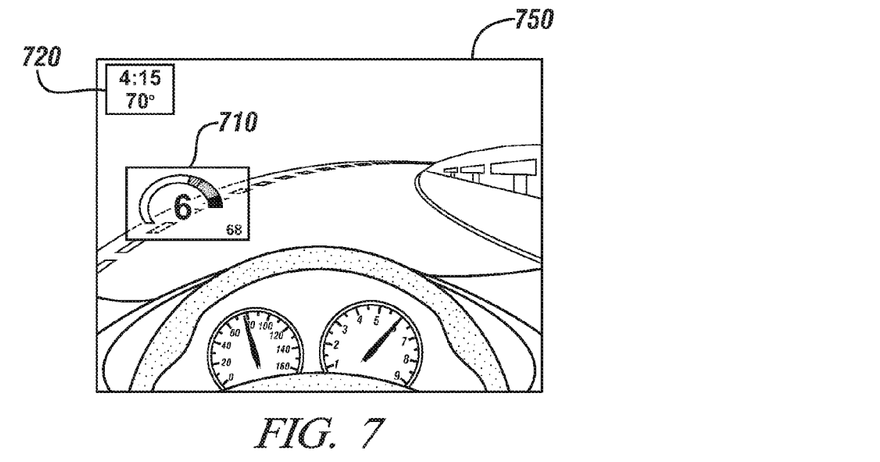
FIGS. 7-9 illustrate a driving scene including a first graphic representing essential vehicle information dynamically registered to preferred location upon a substantially transparent windscreen head up display and a second graphic representing non-essential vehicle information registered to a fixed location upon the substantially transparent windscreen head up display, in accordance with the present disclosure.

Referring to FIG. 7, a driving scene 700 is illustrated through a substantially transparent windscreen head-up display 750 of a vehicle. A first graphic 710 representing essential vehicle information is dynamically registered to a preferred location upon the substantially transparent windscreen head-up display 750 of the vehicle. A second graphic 720 representing non-essential vehicle information is registered to a fixed location upon the substantially transparent windscreen head-up display 750 of the vehicle. The second graphic 720 describes the time and the ambient temperature. The first graphic 710 describes the engine speed and the vehicle speed. The dynamically registered preferred location can be based on the operator gaze location, a preferred gaze location or a distance between the operator gaze location and the preferred gaze location. Likewise, the first graphic 710 can follow head movement at a preferred distance in the peripheral view of the operator. In other words, the dynamically registered preferred location may be displayed in an area on the windscreen head-up display 750 such that the dynamically registered preferred location is at a location of lesser interest than where the operator is- or should be gazing (e.g., center of road) while minimizing head movement and eye saccades for the operator to view the vehicle information contained in the first graphic 710. Hence, the dynamically registered preferred location can be based on the preferred gaze location where it is offset (e.g., to the left) from the preferred gaze location.

Figure 8:
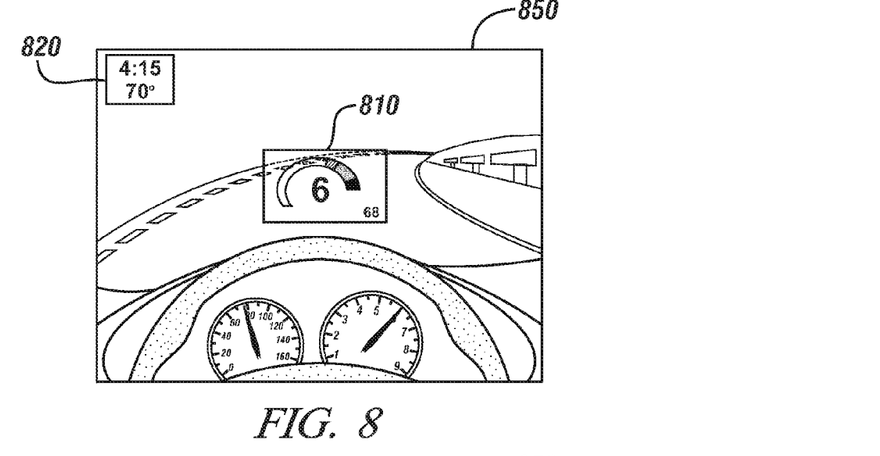

Referring to FIG. 8, a driving scene 800 is illustrated through a substantially transparent windscreen head-up display 850 of a vehicle. A first graphic 810 and a second graphic 820 are displayed and are identical to the first graphic 710 and the second graphic 720 in FIG. 7, except the dynamically registered preferred location of the first graphic 810 is at a different location. For instance, if the dynamically registered preferred location of the first graphic is offset from the operator's gaze location, the first graphic can emulate movement of the operator's gaze when the operator's gaze location shifts to the right edge of the road. Therefore, the dynamically registered preferred location is displayed in an area on the windscreen head-up display 850 such that the preferred location is at a location of lesser interest than where the operator is currently gazing (e.g., right edge of road) while minimizing head movement and eye saccades for the operator to view the vehicle information contained in the first graphic 810. Hence, the dynamically registered preferred location can be based on the preferred gaze location where it is offset (e.g., to the left) from the preferred gaze location.

Figure 9:
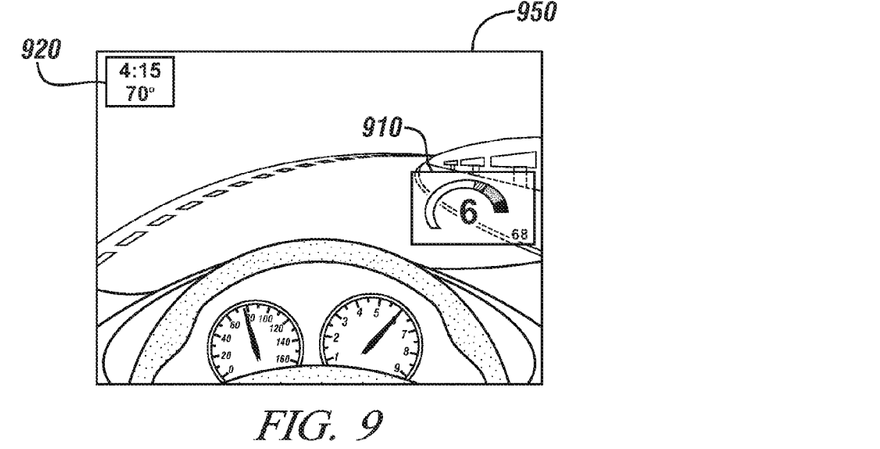

Referring to FIG. 9, a driving scene is illustrated through a substantially transparent windscreen head-up display 950 of a vehicle. A first graphic 910 and a second graphic 920 are displayed and are identical to the first graphic 710 and the second graphic 720 in FIG. 7, except the dynamically registered preferred location of the first graphic 910 is at a different location. In a non-limiting example, the dynamically registered preferred location may be based on a preferred gaze location wherein the preferred gaze location corresponds to the center of the road. Hence, the dynamically registered preferred location is displayed in an area on the windscreen head-up display 850 such that the dynamically registered preferred location is at a location of lesser interest than the preferred gaze location where the operator is currently—or should be—gazing (e.g., center of road) while minimizing head movement and eye saccades for an operator of the vehicle to view the vehicle information contained in the first graphic 910. Hence, the dynamically registered preferred location can be displayed at the preferred gaze location or offset from the preferred gaze location.

The above disclosure describes a substantially transparent head-up display capable of full-screen display. Similar methods can be employed upon windscreens utilizing a substantially full-windscreen display, a partial windscreen display, for example limited to the driver's half of the windscreen, or a display focused or limited to the straight-forward typical center of view of the operator. The disclosure is not limited to windscreens, but can include substantially transparent head-up displays that include side windows or a rear window of a vehicle. Graphics can additionally be projected upon pillars of the vehicle. Many embodiments of displays are envisioned, and the disclosure is not intended to be limited to the particular exemplary embodiments described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to dynamically register a graphic representing essential vehicle information onto a driving scene of a subject vehicle utilizing a substantially transparent windscreen head up display, comprising:
    monitoring subject vehicle information;
    monitoring a location and an orientation of the subject vehicle and monitoring a subject vehicle operational environment;
    identifying the essential vehicle information based on the monitored subject vehicle information;
    determining a reference view point based on the monitored location and orientation of the subject vehicle and the subject vehicle operational environment, wherein the reference view point corresponds to an identified salient driving scene feature concerning operation of the subject vehicle that should be viewed by an operator of the subject vehicle through the windscreen head up display;

determining the graphic representing the essential vehicle information;

monitoring data related to an operator's eye location;

determining a preferred operator gaze location based on the operator's eye location and the reference view point, the preferred operator gaze location representing a location upon the windscreen head up display at which the operator should be gazing;

estimating the operator's gaze location based on the data related to the operator's eye location, the operator's gaze location corresponding to a point where the operator's eyes are focused;

dynamically registering a preferred location for the graphic upon the substantially transparent windscreen head up display based upon the operator's gaze location and the preferred operator gaze location in accordance with minimizing an operator's head movement and eye saccades for viewing the graphic, the preferred location of the graphic dynamically emulating movement of the operator's gaze location; and displaying the graphic upon the substantially transparent windscreen head up display based upon the preferred location;

wherein when the preferred location of the graphic is between the operator's gaze location and the reference view point corresponding to the identified salient driving scene feature, one of dynamically adjusting the preferred location to a viewing location upon the substantially transparent windscreen head up display not between the operator's gaze location and the salient driving scene feature, and decreasing illumination of the graphic displayed upon the substantially transparent windscreen head up display.

2. The method of claim 1 wherein identifying the essential vehicle information comprises an operator specification of essential vehicle information.

3. The method of claim 1 wherein identifying the essential vehicle information further comprises dynamically updating the essential vehicle information based on transitions in the monitored subject vehicle information.

4. The method of claim 1 wherein monitoring subject vehicle information comprises monitoring at least one of the subject vehicle's speed, engine speed, transmission state, engine coolant temperature, fuel economy, battery SOC, oil level, tire pressure, odometer mileage and wheel slip.

5. The method of claim 1 wherein monitoring subject vehicle information comprises:

monitoring a road geometry and monitoring a location and an orientation of the subject vehicle; and determining a distance to an approaching maneuver point based on the monitored road geometry and the monitored location and orientation of the subject vehicle.

6. The method of claim 1 wherein monitoring subject vehicle information comprises monitoring at least one of road hazards, navigation information, safety information, location and orientation of the subject vehicle, estimated time of arrival, audio information, a view from behind the subject vehicle, location and orientation of traffic vehicles, lap times, lap splits, laps remaining and informational race flags.

7. The method of claim 1 wherein monitoring subject vehicle information comprises:

monitoring a location and an orientation of each of a plurality of traffic vehicles;

monitoring a location and an orientation of the subject vehicle; and determining a position of the subject vehicle and each of the plurality of traffic vehicles based on the monitored location and orientation of the subject vehicle and each of the plurality of traffic vehicles.

8. The method of claim 1 wherein the preferred location of the graphic is offset from the preferred operator gaze location and within a foveal view of the operator's gaze location.

9. The method of claim 1 further comprising:

monitoring the operator's gaze location, wherein the preferred location of the graphic is further based upon a distance between the operator's gaze location and the preferred operator's gaze location.

10. The method of claim 1 wherein displaying the graphic upon the substantially transparent windscreen head up display based upon the preferred location comprises displaying the graphic at a location upon the substantially transparent windscreen head up display offset from the preferred location based on an operator input.

11. The method of claim 1 further comprising:

monitoring subject vehicle operation and a location and orientation of the subject vehicle based on the monitored subject vehicle information;

determining a historical subject vehicle operation profile and a preferred subject vehicle operation profile based on the monitored subject vehicle operation and the monitored subject vehicle location and orientation; and comparing the historical subject vehicle operation profile and the preferred subject vehicle operation profile.

12. Method to dynamically register graphics onto a driving scene of a subject vehicle utilizing a substantially transparent windscreen head up display, comprising:

monitoring subject vehicle information;

identifying essential and non-essential vehicle information based on the monitored subject vehicle information, wherein the essential and non-essential vehicle information are operator specified;

monitoring a location and an orientation of the subject vehicle and monitoring a subject vehicle operational environment;

determining a reference view point based on the monitored location and orientation of the subject vehicle and the subject vehicle operational environment, wherein the reference view point corresponds to an identified salient driving scene feature concerning operation of the subject vehicle that should be viewed by an operator of the subject vehicle through the windscreen head up display;

determining a first graphic representing the essential vehicle information;

determining a second graphic representing the non-essential vehicle information;

monitoring an operator's eye location;

determining a preferred operator gaze location based on the operator's eye location and the reference view point, the preferred operator gaze location representing a location upon the windscreen head up display at which the operator should be gazing;

estimating the operator's gaze location based on the monitored eye location, the operator's gaze location corresponding to a point where the operator's eyes are focused;

dynamically registering a preferred location for the first graphic upon the substantially transparent windscreen head up display based upon the operator's gaze location and the preferred operator gaze location in accordance with minimizing the operator's head movement and eye saccades for viewing the graphic, the preferred location of the graphic dynamically emulating movement of the operator's gaze location;

registering a fixed-location for the second graphic upon the substantially transparent windscreen head up display; and displaying the first and second graphic upon the substantially transparent windscreen head up display;

wherein when the preferred location of the graphic is between the operator's gaze location and the reference view point corresponding to the identified salient driving scene feature, one of
- dynamically adjusting the preferred location to a viewing location upon the substantially transparent windscreen head up display not between the operator's gaze location and the salient driving scene feature, and
- decreasing illumination of the first graphic displayed upon the substantially transparent windscreen head up display.

13. The method of claim 12 further comprising:

when the identified salient feature is within a predetermined viewing area of the registered fixed-location of the second graphic, decreasing illumination of the second graphic.

* * * * *